United States Patent

[11] 3,609,578

[72] Inventors Ronald H. Chapman
Wheaton;
James J. Michalik, Hoffman Estates, both of Ill.

[21] Appl. No. 20,625
[22] Filed Mar. 18, 1970
[45] Patented Sept. 28, 1971
[73] Assignee Motorola, Inc.
Franklin Park, Ill.

[54] OSCILLATOR HAVING FEEDBACK AMPLITUDE CONTROL AND SWITCHABLE OUTPUT PHASE SHIFTER
13 Claims, 3 Drawing Figs.

[52] U.S. Cl. 331/45, 325/55, 331/75, 331/109, 331/116 M, 331/156, 331/183
[51] Int. Cl. H03b 3/02, H03b 5/30, H03b 27/00
[50] Field of Search 331/75, 109, 116 M, 156, 179, 183, 45, 77; 325/55

[56] References Cited
UNITED STATES PATENTS

| | | | |
|---|---|---|---|
| 3,213,388 | 10/1965 | Rothschild | 331/45 |
| 3,239,776 | 3/1966 | Shaw | 331/183 X |
| 3,460,056 | 8/1969 | Berger | 331/183 X |

*Primary Examiner*—Roy Lake
*Assistant Examiner*—Siegfried Grimm
*Attorney*—Mueller, Aichele & Rauner

ABSTRACT: An oscillator circuit for providing a constant amplitude output tone includes a differential amplifier and a frequency-selective, feedback network. A regulating circuit is connected from an oscillator output to the feedback network, and as the output of the oscillator exceeds a predetermined threshold, the regulating circuit develops a regulating signal which is proportional to the amplitude of the output and opposite phase to the feedback signal. This regulating signal and the feedback signal interreact to provide a composite feedback signal whose amplitude is inversely proportional to the oscillator output to thereby hold the output at a preselected level. The oscillator is operable to provide a predetermined phase shift in the output tone.

PATENTED SEP 28 1971

3,609,578

INVENTORS
RONALD H. CHAPMAN
JAMES J. MICHALIK

BY
Mueller, Aichele + Rauner
ATTYS.

OSCILLATOR HAVING FEEDBACK AMPLITUDE CONTROL AND SWITCHABLE OUTPUT PHASE SHIFTER

BACKGROUND OF THE INVENTION

Audio frequency signal generators or oscillators which produce relatively undistorted, single frequency sinusoidal output waves or electrical tones of constant amplitude are utilized in many electronic applications. In particular, such oscillators may operate in cooperation with a radio frequency transmitter to function as part of a selective calling system as described in U.S. Pat. No. 2,974,221, which issued on Mar. 7, 1961 to Robert Peth, and which is assigned to the assignee of the present invention.

The aforementioned calling system is comprised of a transmitter operating on a particular carrier frequency and a plurality of normally silent receivers all tuned to the carrier frequency. Each receiver includes a frequency selective, electromechanical device which is only set into vibration by an electrical tone of a particular single frequency, which may be called a receiver selecting tone and which is demodulated from the carrier. Vibration of the device activates circuitry to allow aural information, which is also modulated on the carrier, to be reproduced at the loudspeaker of the receiver. Therefore, if it is desired to communicate aural information through a particular receiver, it is necessary that both the information and the particular receiver-selecting tone or frequency for that receiver be modulated onto the carrier.

There are three requirements which should be met by a low frequency oscillator or tone generator utilized to modulate the transmitter in the selective calling system of the aforementioned patent. First, the receiver selecting tone or output of the oscillator should have a sinusoidal waveform so that unwanted modulation products are not created as the tone is mixed with the carrier signal in the modulator. Next, the tone should have a constant amplitude and stable frequency in spite of changes caused by temperature, supply voltage, aging, component replacement, etc. Finally, immediately after the transmission of information has ceased, the oscillator should be operable to produce a receiver muting tone. This muting tone while having the same frequency and amplitude as the receiver selecting tone should have the correct phase difference, with respect to the receiver selecting tone, to damp out the movement of the vibrating device in the receiver so that unwanted noise is not passed through the receiver after the transmitter carrier frequency is terminated.

Prior art audio frequency tone oscillators or encoders have attempted to meet with foregoing requirements of minimum distortion and constant amplitude by using limiters to prevent the amplifier of the oscillator from going into saturation and thereby clipping the output signal.

Oscillators, operating at radio frequencies, are also known which generate sinusoidal signals having constant amplitude and minimum distortion by utilizing amplitude limiters which symmetrically clip the sinusoidal feedback signal of the oscillator at a predetermined amplitude.

In the foregoing prior art techniques, there is a tendency of the amplitude of the output tone to still vary as the gain of the amplifier changes with age, temperature, supply voltage, variations, and component replacement. Moreover, inasmuch as parameters vary between components of the same kind, there is an undesirable tendency for different tone oscillators even though they are manufactured to identical specifications to generate output signals having different amplitudes.

SUMMARY OF THE INVENTION

It is an object of the invention to provide an audio frequency oscillator which is compact, inexpensive and lightweight and which provides a substantially undistorted sinusoidal output wave of constant amplitude and frequency.

Another object of the invention is to provide an audio frequency oscillator whose circuit configuration is particularly adaptable to being manufactured in the form of an integrated circuit.

A further object of this invention is to provide an audio frequency oscillator wherein the amplitude of the output signal remains substantially constant even though the parameters of the active and passive components of the amplifier and feedback circuit change in response to temperature, age, supply voltage variation and component replacement.

A still further object of the invention is to provide a single frequency audio tone encoder which is suitable for use in cooperation with the transmitter of a selective calling communication system wherein it is desired that the encoder provide a predetermined change in phase of its output signal in response to an enabling signal applied thereto from the transmitter.

In brief, the oscillator circuit includes an amplifier having a frequency selective, feedback network connected between an output and the input thereof. An amplitude regulating circuit is connected between the output of the amplifier and the input of the feedback network. As the amplitude of the output tone exceeds a predetermined threshold, a regulating signal is provided at the output of the regulating circuit which is proportional to the amplitude of the output tone but of opposite phase to the feedback signal. The regulating signal and the feedback signal combine or interreact to provide a composite feedback signal which is inversely proportional to the amplitude of the output, after it exceeds the threshold. Since the amplitude of the output signal is proportional to the amplitude of the composite feedback signal, the amplitude of the output is thus held at a preselected level.

DESCRIPTION OF THE PREFERRED EMBODIMENT

Figure 1:
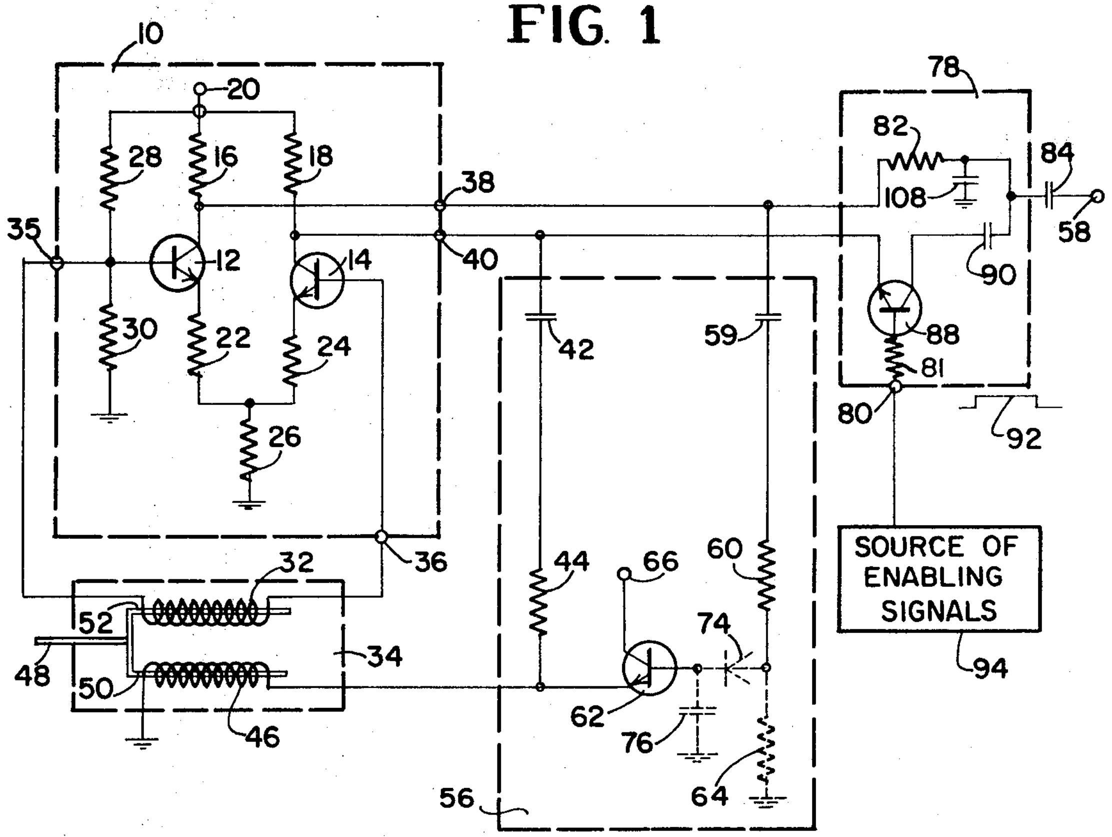
FIG. 1 is a schematic diagram of the audio frequency oscillator of one embodiment of the invention.

The audio frequency oscillator or electrical tone generator of one embodiment of the invention, as shown in FIG. 1 includes as its active element a balanced differential amplifier 10 which is of known configuration. The collectors of transistors 12 and 14 of amplifier 10 are respectively connected through load resistors 16 and 18 to terminal 20 of a direct current DC supply. The emitters of transistors 12 and 14 respectively connected through emitter resistors 22 and 24 to resistor 26 and through resistor 26 to a ground or reference potential. Resistors 28 and 30 form a voltage divider for supplying bias directly to the base of transistor 12 and through secondary 32 of electromechanical device 34 to the base of transistor 14. Differential amplifier 10 may be considered as having two input terminals 35 and 36, and two output terminals 38 and 40.

The feedback and frequency determining path for the oscillator of FIG. 1 begins at output terminal 40 of amplifier 10 and runs through the series circuit comprised of capacitor 42, resistor 44 and device 34 to input terminals 35 and 36. Device 34 includes a mechanical resonant member 48 which may be mounted in a suitable manner for vibrating at its mechanical resonant frequency. Although the resonant member shown is in the nature of a tuning fork, it will be apparent to those skilled in the art that device 34 could employ many other varieties of mechanically resonant structures. Driving coil or primary 46 of device 34 is positioned around one arm 50 of tuning fork 48; sensing coil or secondary 32 is positioned around the other arm 52. Current fed to coil 46 will set the fork 48 in motion at its mechanical resonant frequency which may be in the audio range. This motion causes an alternating current AC of a frequency equal to that of fork 48 to be developed in coil 32. Primary coil 46 and secondary coil 32 may be positioned in various ways in relation to the resonant member 48 to drive and sense the same. For example, the coils may surround the extremities of the vibratory member 48, as shown in the schematic diagram, or they may be coupled adjacent to the member or to a portion thereof.

In operation, as a DC potential is applied to terminals 20, a current transient will be conducted through DC blocking capacitor 42 and resistor 44 to excite device 34 into mechanical and electrical oscillation. As previously mentioned, device 34 develops a single frequency AC signal of an audio frequency across its secondary 32. This signal is applied through inputs 34 and 36 to the bases of transistors 12 and 14. The signals at the ends of secondary 32 will be 180° out of phase with each other. For instance, when the end of secondary 32 which is connected to the base of transistor 12 is positive, the end of secondary 32 which is connected to the base of transistor 14 will be negative and vice versa. Thus if the forward bias on the base of transistor 12 is increased, the forward bias on the base of transistor 14 is decreased. As a result, the voltages at the collectors of transistors 12 and 14 and outputs 38 and 40 will, likewise, always be 180° out of phase with each other. The AC signal at amplifier output terminal 40 will be coupled through capacitor 42 and resistor 44 to maintain the vibration of device 34 and thereby sustain oscillation. Capacitor 42 blocks the DC bias potential applied from terminal 20 from being continuously applied to the device 34; resistor 44 attenuates the amplitude of the AC feedback signal applied to device 34 from output 40.

If amplitude regulating circuit 56 of FIG. 1 was not connected to amplifier 10, the amplitude of the positive feedback signal from output terminal 40 would increase to where transistors 12 and 14 would alternately be driven between cutoff and saturation. This would result in signals at output 38 and output 40 whose wave shape more nearly resembled a square wave than a sinusoid. Furthermore, uncompensated changes in any of the critical parameters of the oscillator, such as a change in the impedance of the feedback path due to a replacement of device 34, would undesirably change the amplitude of the output signal at terminal 58. This change in amplitude might impair the operation of electronic systems coupled to output 58.

To prevent possible problems created by distortion and changed in amplitude of the output signal, regulator circuit 56 is connected between output terminal 38 of amplifier 10 and the reference or ground potential. Regulator circuit 56 includes capacitor 59 which has one plate connected to terminal 38 of amplifier 10 and its other plate coupled through resistor 60 to the base of transistor 62. Resistor 64, which is connected between the base of transistor 62 and the reference potential, cooperates with resistor 60 to form a voltage divider. A selected portion of the AC signal applied to the divider through capacitor 59 is developed at the base of transistor 62 by this voltage divider. The collector of transistor 62 is connected to terminal 66 of a direct current voltage supply which may be the same supply that delivers power to terminal 20. The emitter of transistor 62 is connected through primary coil 46 of resonant device 34 to the reference potential. Transistor 62, is, therefore, a common collector amplifier which drives into an AC load impedance presented by primary 46.

As previously pointed out, the AC voltages at amplifier output terminals 38 and 40 are 180° out of phase with each other. Therefore, as the amplitude of the oscillating signal of one phase builds up at output terminal 38, an oscillating signal of the opposite phase, but similar in amplitude, will likewise build up on output terminal 40. The oscillating signal at output terminal 38 is coupled through DC blocking capacitor 59 to the voltage divider comprised of resistors 60 and 64. The portion of the oscillating voltage developed across resistor 64 is applied to the base of transistor 62. As the positive-going amplitude of alternate half cycles of this alternating voltage across resistor 64 exceeds the forward bias threshold voltage 67, see dashed line of FIG. 2A, of transistor 62, pulses or regulating signal 68 is developed across primary winding 46. A comparison of the feedback signal 70, shown in FIG. 2B, with the regulating signal 68 discloses that signals 68 and 70 are of opposite polarity and phase.

As signals 68 and 70 interreact with each other, signal 68 tends to subtract from the negative-going excursions of feedback signal 70 to form a composite driving signal in primary 46 having a waveform 72 shown in FIG. 2C. The waveform of driving signal 72 is shaped by device 46 into a sinusoidal composite feedback signal 73 (FIG. 2D) which has relatively little distortion. Composite feedback signal 73 is applied from secondary 32 of device 34 to inputs 35 and 36 of amplifier 10 to sustain oscillation. The amplitudes of regulating signal 68 and feedback signal 70 are selected such that the composite feedback signal 73 has sufficient amplitude to provide an oscillator output signal at terminal 58 of the desired amplitude without driving transistors 12 and 14 into saturation, or cutoff which would produce unwanted distortion of the oscillator output signal.

If it is desired to remove some of the distortion from driving signal 72, diode 74 and capacitor 76, both of which are drawn in dotted lines in FIG. 1 and connected to the base of transistor 62, can be included in regulating circuit 56. Diode 74 will rectify the alternating voltage from output 38 to charge capacitor 76 which provides a forward base bias to turn on transistor 62 which then will pass a regulating signal whose waveform is more sinusoidal than regulating signal 68, and 180° out of phase with feedback signal 70. As a result the waveform of driving signal 72 will be more sinusoidal.

If the amplitude of the amplifier output signal at output terminal 38 tends to undesirably increase, the amplitude of the output signals at terminals 38 and 40 will likewise tend to increase. This tendency for the amplitudes of the output signals to increase could be caused, for example, by the replacement of frequency determining device 34 with a similar device which has a different frequency and a lower insertion loss than device 34. It could also be caused by an increase in gain of either transistors 12 or 14 with age, temperature, change in supply voltage, etc. Provided that the amplitude of the signal applied to the base of transistor 62 is sufficient to forward bias the transistor, the tendency of the amplitude of the signal at terminal 38 to increase results in an increase in the amplitude of regulating signal 68 which decreases the amplitude of driving signal 72 and composite feedback signal 73 to thereby lower the level of the oscillator output signal to a predetermined amplitude.

Similarly, when the amplitude of the amplifier output signal at output 38 tends to undesirably decrease, the amplitude of the output signal at terminal 40 will likewise tend to decrease. This tendency for the amplitude of the output signals to decrease might be caused by a decrease in the gain of either transistors 12 or 14 or replacement of frequency determining device 34 with a similar device which has a higher insertion loss than device 34. Provided that the amplitude of the signal applied to the base of transistor 62 is sufficient to forward bias the transistor, the tendency of the amplitude of the signal at terminal 38 to decrease results in a decrease in the amplitude of regulating signal 68, which increases the amplitude of driving signal 72 and composite feedback signal 73 to thereby raise the level of oscillator output signal to its predetermined amplitude. The regulator circuit 56, therefore, instantaneously readjusts the amplitude of the oscillator output signal to a given predetermined level even though parameter changes take place in the oscillator which are not compensated by the inherent balancing characteristics of differential amplifier 10. Hence, the audio frequency oscillator of FIG. 1 provides a substantially undistorted, sinusoidal output wave of constant amplitude and frequency.

Although the description of the preferred embodiment has been related to a differential amplifier 10, it will be apparent to those skilled in the art that differential amplifier 10 could be replaced by an amplifier having a single output voltage which is in phase with its input voltage. If this was done the single output of the amplifier could be connected to both frequency determining device 46 and amplitude-regulating circuit 56. The necessary phase inversion between the feedback signal which drives the frequency determining device, and the regulating signal could be accomplished, for instance, by providing a common emitter amplifier to invert the phase of the amplifier output signal anywhere in the signal path of regulator 56 which extends from the output of the amplifier to the input of the frequency determining device.

One of the many possible electronic applications utilizing the single frequency, audio oscillator described in the foregoing portion of this specification, is the selective calling system described in U.S. Pat. No. 2,974,221 which was granted to Robert Peth on Mar. 7, 1961 and assigned to the assignee of the present invention. In this system an information signal and a receiver selecting tone are simultaneously modulated onto a carrier being emitted by a transmitter. All receivers in the calling system tuned to the carrier frequency will demodulate both the selective calling tone and the information signal; however, tone-responsive squelch circuits in the receivers prevent the information signal from being applied to the loudspeaker unless the demodulated tone has a particular frequency. These tone-responsive squelch circuits utilize resonant tuning devices which may be similar to device 34 of the schematic diagram in FIG. 1. If the received tone is at the frequency of mechanical resonance of the electromechanical device, the squelch circuit will allow the information signal to be amplified and applied to the loudspeaker of the receiver.

As the transmission of information ceases, the receiver selecting tone is immediately discontinued. Since the resonant device of the receiver has a certain finite size and weight, once it is set in motion it will continue to vibrate for a short period of time even though its energizing tone has been removed. Cessation of the carrier signal is delayed for approximately 150 milliseconds after the information signal is discontinued so that the carrier signal will continue for the duration of the vibration of the resonant device. This reduces background noise which otherwise might be heard if the squelch circuit was held open while no carrier signal was being received.

To promote rapid damping of the receiver tone device, a receiver muting tone of the same frequency and amplitude as the receiver calling tone, but of a different phase, may be applied immediately after the information signal ceases and before the delayed carrier transmission ends. To provide effective damping, the phase of the voltage of the receiver muting tone should lead the phase of the voltage of the receiver selecting tone by about 240°. This is because the motion of the vibrating member leads the applied voltage by approximately 60°, and it is desirable for the muting tone to be 180 ° out of phase with this motion to provide the most effective damping thereof.

Phase network 78 which is connected from both outputs 38 and 40 of amplifier 10 to oscillator output 58 provides the required phase shift to change the receiver calling tone into a muting tone in response to an enabling signal applied to terminal 80 and resistor 81 thereof from the transmitter. Phase network 78 is comprised of resistor 82 which is connected between coupling capacitor 84 and output 38 of amplifier 10. The emitter of control transistor 88 is connected to output 40 of amplifier 10, its collector is connected through capacitor 90 to coupling capacitor 84, and its base is connected to enabling terminal 80. The receiver calling tone is applied from output 38 of amplifier 10, through resistor 82 and capacitor 84 to oscillator output 58. Transistor 88 is normally off.

In operation, when it is desired to generate the aforementioned receiver muting tone, an enabling pulse 92, FIG. 1, is applied from the transmitter circuitry or source of enabling signals 94 to enabling terminal 80. This enabling signal 92 turns transistor 88 on during its duration which allows the output signal from terminal 40 to be applied through phasing capacitor 90 to output capacitor 84. The values of resistor 82 and capacitor 90 are selectively chosen so that the phase shifted oscillator output signal comprised of the combination of the AC voltage through resistor 82 and the AC voltage through capacitor 58 has the appropriate leading phase of 420°, with respect to the signal at output 38, and the same amplitude and frequency as the signal at output 38.

Figures 2, 3:
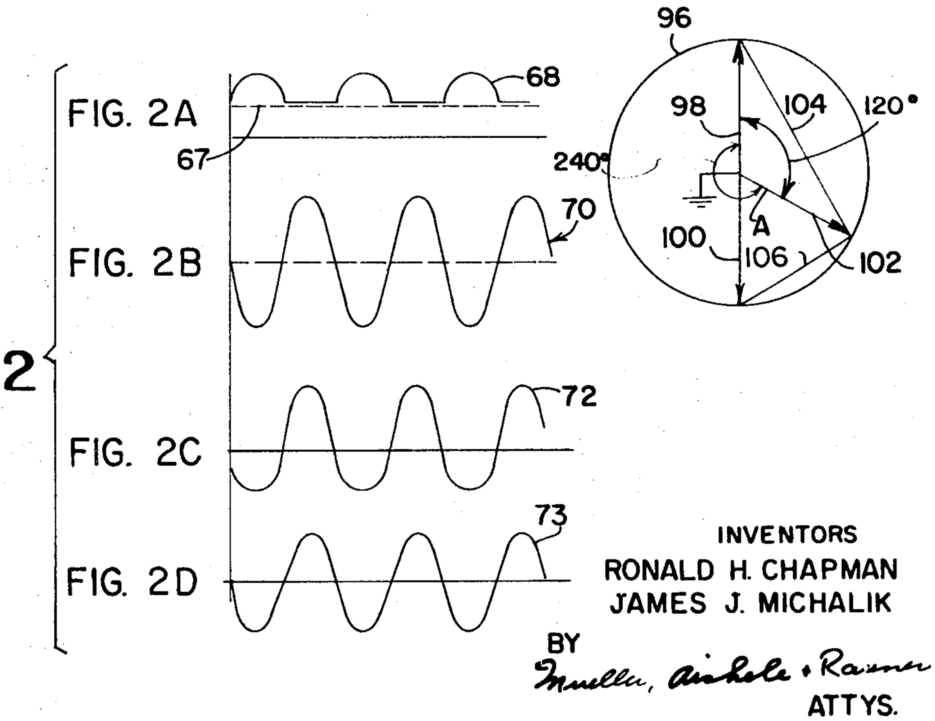
FIG. 2 shows a set of waveforms which are useful in explaining and understanding the operation of the oscillator of FIG. 1.
FIG. 3 is a phasor diagram which illustrates how the values of selected components in a phase shifting network of the oscillator of FIG. 1 are chosen.

FIG. 3 shows a phasor diagram which is useful in determining the ratio of the values of capacitor 90 and resistor 82 which will respectively provide the desired phase shift and amplitude change in the signals of amplifier 10 so that their composite at output 58 of the oscillator has the desired phase angle and amplitude. In this diagram, the area within the circle 96 comprises the locus of all possible composite, oscillator output voltages which can be formed by combining the AC voltage at output 38, represented by phasor 98, and the voltage at output 40, represented by phasor 100. Since phasor 102 has the same length as phasor 89, and hence the same amplitude as the receiver selecting tone, and a leading phase angle of 240° with respect to phasor 98, it represents the desired muting tone. The length of line 104 represents the resistance of resistor 82, and the length of line 106 represents the reactance of capacitor 90 at the frequency of the muting tone. Hence, the ratio of the length of line 104 to the length of line 106 is equal to the ratio of the required resistance of resistor 82 to the required capacitive reactance of capacitor 90.

As previously pointed out, frequency determining device 34 may be replaced by similar frequency determining devices having different resonant frequencies to provide different frequencies of oscillation. Since the combination of resistor 82 and capacitor 90 is chosen for a particular frequency, the response of phasing network 78 to the different frequencies is one of varying phase angle. Capacitor 108 is connected between one end of resistor 82 and the reference potential and its value is chosen so that it tends to hold the phase angle 78 constant with respect to the intended range of frequency operation. The resulting phasing network 87 comprised of resistor 82, capacitor 90 and capacitor 108, has fewer components than the usual phase-shifting network required in prior art tone encoders, and its output for either phase is more constant in amplitude over the frequency range.

What has been described, therefore, is a tone encoder or single audio frequency oscillator which is suitable for use in cooperation with a selective calling communication system wherein it is desired that the encoder provide a predetermined change of phase in its output signal in response to enabling signal applied thereto from the transmitter. Furthermore, the configurations of amplifier 10, amplitude regulating circuit 56 and phasing network 87 are readily adaptable to being manufactured in integrated circuit form on a single chip resulting in consequent advantages such as savings in space and cost.

We claim:

1. An oscillator for generating a single frequency sinusoidal output signal having a substantially constant predetermined amplitude, said oscillator including in combination, an amplifier having output means and input means, frequency-selecting means having an input circuit and an output circuit, first circuit means coupling said output means of the amplifier to said input circuit of the frequency-selecting means, said circuit means coupling said output circuit of the frequency selecting means to said input means of the amplifier; said first circuit means, frequency-selecting means and second circuit means providing a path for a single frequency feedback signal from said output means of the amplifier to said input means of the amplifier to sustain output signal oscillations at such frequency, regulator means coupled between said output means of the amplifier and said input circuit of the frequency-selecting means, said regulator means being rendered conductive in response to an output signal of a predetermined amplitude which is greater than a given threshold to provide portions of said output signal which are of opposite phase with respect to said feedback signal to said input circuit of the frequency-selecting means, said portions interreacting with said feedback signal to provide a composite feedback signal at said input circuit of the frequency-selecting means whose amplitude varies inversely with the amplitude of said output signal provided that said amplitude of the output signal has exceeded said threshold, said composite feedback signal thereby having an amplitude which is limited to a predetermined level, said frequencysselecting means and said second circuit means coupling said composite feedback signal to said input means of the amplifier to limit said amplitude of the output signal to a predetermined level.

2. The oscillator of claim 1 wherein said frequency-selecting means is an electromechanical device having a predetermined mechanical resonant frequency which controls the frequency of said feedback signal and said composite feedback signal so that the sinusoidal output signal of the oscillator is sustained only at said mechanical resonant frequency.

3. The oscillator of claim 1 wherein said output means of the amplifier includes first and second output terminals, said amplifier providing first and second oscillating output signals of the same amplitude which are out of phase with each other respectively at said first and second output terminals, said first circuit means being coupled between said first output terminal and said input circuit of the frequency-selecting means, said regulator means being coupled between said second output terminal of the amplifier and said input circuit of the frequency-selecting means, said regulator means being rendered conductive in response to said second output signal of a predetermined amplitude to conduct portions thereof which are of opposite phase with respect to said feedback signal to said input circuit of the frequency-selecting means, said portions interreacting with said feedback signal to provide said composite feedback signal at said input circuit of the frequency-selecting means whose amplitude varies inversely with the amplitude of said second output signal provided that said amplitude of the second output signal has exceeded said threshold.

4. The oscillator of claim 3 wherein said amplifier is a differential amplifier and said first and second output signals are 180° out of phase with each other.

5. The oscillator of claim 3 further including a phase-shifting means for providing a third output signal having a preselected amplitude and a preselected phase shift with respect to either of said first or second output signals, said third output signal being initiated in response to an enabling signal provided by an external source, such phase-shifting means being comprised of: a resistor connecting one of said first and second output terminals of the amplifier to the output terminal of the phase-shifting means, said resistor conducting one of said first and second output signals to said output terminal of the phase-shifting means; switching means having input, control and output electrodes, said input electrode being connected to the other one of said first and second output terminals of the amplifier, supply providing the enabling signal connected to said control electrode, capacitor coupling said output electrode of the switching means to said output terminal of the phase-shifting means, said switching means being rendered conductive in response to said enabling signal to thereby apply the other one of said first and second output signals through said capacitor to develop a phase-shifted signal at said output terminal of the phase-shifting means, said one of the first and second output signals and said phase-shifted signal combining at said output terminal of the phase-shifting means to form the third output signal, said capacitor and said resistor having selected impedances which cooperate with said first and second output signals to provide the third output signal having the preselected phase shift and amplitude.

6. The combination of claim 5 wherein said resistor is connected to said second output terminal of the amplifier and said input electrode of the switching means is connected to said first output terminal of the amplifier.

7. The combination of claim 5 wherein said switching means is a transistor and said input electrode is the emitter, said control electrode is the base, and said output electrode is the collector.

8. An encoder for generating both a first single frequency sinusoidal encoding signal having a constant predetermined amplitude and a second single frequency sinusoidal encoding signal having the same constant predetermined amplitude and having a predetermined constant phase shift with respect to said first encoding signal and wherein the first encoding signal is terminated and the second encoding signal is initiated in response to an enabling signal provided by an external source; such encoder including in combination:

an oscillator providing first and second oscillating signals of the same amplitude and frequency which are out of phase with each other respectively at first and second oscillator terminals;

phase-shifting means including a resistor connecting said first terminal of the oscillator to the encoder output terminal, said resistor conducting the first oscillating signal to said output terminal of the encoder to provide the first encoding signal;

said phase-shifting means further including switching means having input, control and output electrodes, said input electrode being connected to said second oscillator terminal of the oscillator, said source of enabling signals connected to said control electrode, capacitor means coupling said output electrode of the switching means to said output terminal of the encoder, said switching means being rendered conductive in response to an enabling signal to apply said second oscillating signal through said capacitor means to develop a phase-shifted signal at said output terminal of the encoder, said first encoding signal and said phase-shifted signal combining at said output terminal of the encoder to form the second encoding signal.

9. The encoder of claim 8 wherein said switching means is a transistor and said input electrode is the emitter, said control electrode is the base and said output electrode is the collector.

10. The encoder of claim 8 wherein said first and second oscillating signals are 180° out of phase with each other, and said capacitor means and said resistor have selected impedances to provide the second encoding signal which has both a constant leading phase angle on the order of 240° with respect to said first encoding signal and an amplitude substantially equal to the amplitude of said first encoding signal.

11. The encoder of claim 8 wherein said oscillator includes an amplifier having an input terminal and first and second output terminals respectively connected to said first and second oscillator terminals; frequency-selecting means having an input terminal coupled to said second amplifier output terminal and an output terminal coupled to said amplifier input terminal, said frequency-selecting means providing a path for a feedback signal from said second oscillator output terminal to said amplifier input terminal to sustain the oscillation of said first and second oscillating signals at a preselected frequency, regulator means coupled between said first amplifier output terminal and said input terminal of the frequency-selecting means, said regulator means being rendered conductive in response to a predetermined amplitude of said first oscillating signal to conduct portions of the same which are of opposite polarity and opposite phase with respect to said feedback signal to said input terminal of the frequency-selecting means, said portions interreacting with said feedback signal to provide a composite feedback signal whose amplitude varies inversely with the amplitudes of said first and second oscillating signals, said composite feedback signal being coupled through said frequency-selecting means to said input terminal of the amplifier to thereby limit the amplitudes of said first and second oscillating signals to a predetermined level.

12. The combination of claim 11 wherein said amplifier is a differential amplifier.

13. The combination of claim 11 wherein said frequency-selecting means is an electromechanical device having a predetermined mechanical resonant frequency which controls the frequency of said feedback signal and said composite feedback signal so that said first and second oscillating signals are sustained only at said mechanical resonant frequency.

75